(12) United States Patent
Tomizawa et al.

(10) Patent No.: US 8,705,425 B2
(45) Date of Patent: Apr. 22, 2014

(54) WIRELESS RECEIVING APPARATUS AND TRANSMITTING APPARATUS HAVING A SLEEP CONTROL UNIT

(75) Inventors: Takeshi Tomizawa, Yokohama (JP); Tomoya Tandai, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 284 days.

(21) Appl. No.: 13/223,554

(22) Filed: Sep. 1, 2011

(65) Prior Publication Data

US 2012/0127904 A1    May 24, 2012

(30) Foreign Application Priority Data

Nov. 19, 2010   (JP) ................................. 2010-259171

(51) Int. Cl.
*G08C 17/00*     (2006.01)
*H04B 1/16*      (2006.01)

(52) U.S. Cl.
USPC ...................................... 370/311; 455/343.2

(58) Field of Classification Search
USPC .............................. 370/311; 455/343.2, 343.4
See application file for complete search history.

(56) References Cited

U.S. PATENT DOCUMENTS

2010/0039974 A1   2/2010  Toshimitsu et al.
2011/0318008 A1*  12/2011 Kubo et al. .................... 398/66

FOREIGN PATENT DOCUMENTS

| JP | 2006-13952 A | 1/2006 | |
|---|---|---|---|
| JP | 2010-011423 A | 1/2010 | |
| JP | 2010-50922 A | 3/2010 | |
| WO | WO 2010/098262 A1 * | 2/2010 | .............. H04L 12/44 |

OTHER PUBLICATIONS

Machine translation of JP 2010-011423 A, Jan. 2010 (retreived on Aug. 6, 2013), pp. 11-12.*
Japanese Office Action dated Jun. 4, 2013 (and English translation thereof) in counterpart Japanese Application No. 2010-259171.
Japanese Office Action dated Oct. 23, 2012 (and English translation thereof) in counterpart Japanese Application No. 2010-259171.

* cited by examiner

*Primary Examiner* — Dang Ton
*Assistant Examiner* — Kevin Lee
(74) *Attorney, Agent, or Firm* — Holtz, Holtz, Goodman & Chick, PC (57) ABSTRACT

A wireless receiving apparatus includes a receiving unit, a buffer, a prediction unit, a sleep control unit, an access control unit, a generation unit and a transmitting unit. The receiving unit is configured to receive data to extract a payload data. The buffer is configured to generate a buffer-full signal if a payload data size is larger than a free area size. The prediction unit is configured to generate predicted latency. The sleep control unit is configured to generate sleep information based on the predicted latency. The access control unit is configured to generate a sleep-frame parameter including the sleep information. The generation unit is configured to generate a sleep-frame. The transmitting unit is configured to transmit the sleep-frame. The sleep control unit keeps the power supply in the sleep state for indicating the sleep information after receiving an acknowledgment of receiving of the sleep-frame.

6 Claims, 5 Drawing Sheets

WIRELESS RECEIVING APPARATUS AND TRANSMITTING APPARATUS HAVING A SLEEP CONTROL UNIT

CROSS-REFERENCE TO RELATED APPLICATIONS

This application is based upon and claims the benefit of priority from prior Japanese Patent Application No. 2010-259171, filed Nov. 19, 2010, the entire contents of which are incorporated herein by reference.

FIELD

Embodiments described herein relate generally to a wireless receiving apparatus and transmitting apparatus.

BACKGROUND

In one-to-one communication systems, there is a method of saving power by setting, when communication is not performed, a so-called sleep mode in which electricity is supplied only to necessary minimum elements, and which is realized by utilizing a sequence of operations for achieving intermittent operations, and control frames (C-Sleep and C-Wake) for use in the sequence.

DETAILED DESCRIPTION

A data transmitting side generally performs data retransmission until receiving, from a data receiving side, an acknowledgment (hereinafter, "Ack") of transmitted data. Data retransmission is continued even when the receiving side is tight in capacity and therefore cannot receive any more data. Accordingly, until the receiving side receives the data retransmitted from the transmitting side, the transmitting or receiving side cannot be set in a sleep mode. This means that consumption of power is inevitably increased in proportion to the period of data retransmission.

In general, according to one embodiment, a wireless receiving apparatus includes a receiving unit, a buffer, a prediction unit, a sleep control unit, an access control unit, a generation unit and a transmitting unit. The receiving unit is configured to receive a data item, and to extract a payload data item from the received data item. The buffer is configured to generate a buffer-full signal if a size of the payload data item is larger than a free area size of the buffer, and to store the extracted payload data item if the size of the payload data item is not larger than the free area size. The prediction unit is configured to generate a predicted latency information item indicating a first period of time to secure a free area required for storing the payload data item. The sleep control unit is configured to generate a sleep information item based on the predicted latency information item if the buffer-full signal is generated, the sleep information item indicating a second period of time for which a power supply is kept in a sleep state, the sleep state indicating a state in which electricity is supplied only to elements which are at minimum necessary for activation. The access control unit is configured to generate a sleep frame parameter including the sleep information item. The generation unit is configured to generate a sleep frame based on the sleep frame parameter. The transmitting unit is configured to transmit the sleep frame. The sleep control unit keeps the power supply in the sleep state for the second period of time after receiving an acknowledgment of receiving of the sleep frame.

Wireless receiving apparatus and transmitting apparatus according to the embodiments will be described in detail with reference to the accompanying drawings. In the embodiments below, like reference numbers denote like elements, and duplicate explanation.

(First Embodiment)

Figure 1:
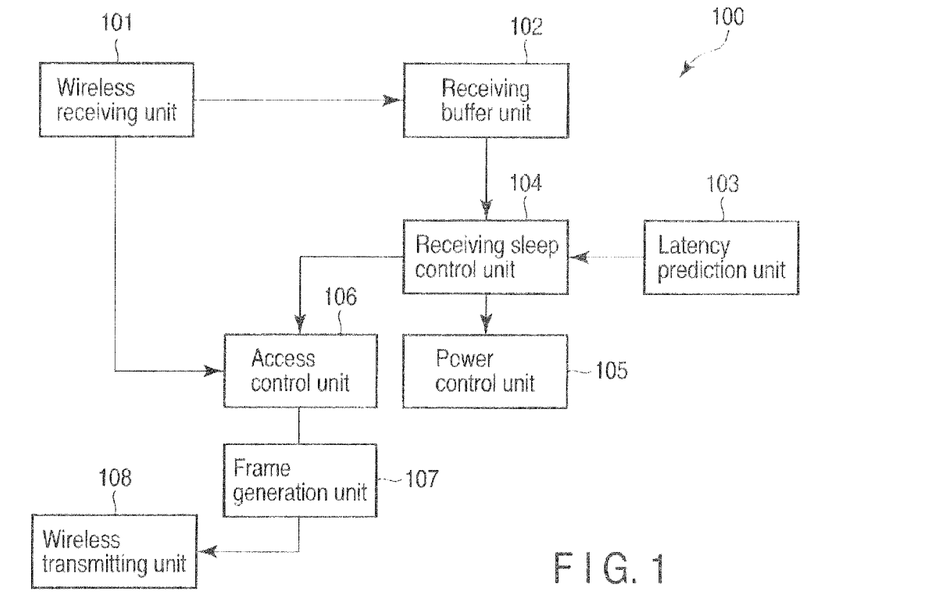
FIG. 1 is a block diagram illustrating a wireless receiving apparatus according to a first embodiment.

Referring first to the block diagram of FIG. 1, a wireless receiving apparatus 100 according to a first embodiment will be described.

The wireless receiving apparatus 100 of the first embodiment includes a wireless receiving unit 101 (also referred to as a receiving unit), a receiving buffer unit 102 (also referred to as a buffer), a latency prediction unit 103 (also referred to as a prediction unit), a receiving sleep control unit 104 (also referred to as a sleep control unit), a power control unit 105, an access control unit 106, a frame generation unit 107, and a wireless transmitting unit 108 (also referred to as a transmitting unit).

The wireless receiving unit 101 includes functions necessary for demodulating a received data item based on the specifications of the wireless communication system including an antenna, filter, frequency converter, low-noise amplifier, demodulator, error correction decoder, header analyzer, etc. The wireless receiving unit 101 receives a data item, and demodulates and analyzes the received data item to thereby extract therefrom a payload data item and a header information item.

The receiving buffer unit 102 contains a memory element. The receiving buffer unit 102 receives the payload data item from the wireless receiving unit 101, and stores the payload data item in the memory element if the payload data has a data size not greater than the free area of the memory element. Further, the receiving buffer unit 102 transfers the stored data item to another storage unit or circuit under the control of, for example, a high-level protocol or a host system (not shown). If the size of the payload data item is greater than the free area of the memory element (this state will also be referred to as a buffer-full state), the receiving buffer unit 102 generates a buffer-full signal.

The latency prediction unit 103 refers to the time required to transfer the data item from the receiving buffer unit 102 to the high-level protocol or the host system, and the time required for the operation sequence of a storage unit as a transfer destination, thereby obtaining a predicted latency information item that indicates the time required to secure a free area for storing the payload data item in the receiving buffer unit 102. In other words, the predicted latency information item indicates the time when a subsequent data frame can be transferred to the buffer. If, for example, a data transfer time is used as the predicted latency, it is sufficient if a preparation time is calculated which is required when data is written to a hard disk drive or a flash memory, and which can be calculated beforehand. Alternatively, the data transfer time may be calculated based on the amount of data and the rate of data transfer. Yet alternatively, as the predicted latency information item, a transfer latency required for the operation sequence of an interface, such as a USB or PCI device, may be calculated. Also alternatively, both the data transfer time and the transfer latency may be calculated and used as the predicted latency information item.

The receiving sleep control unit 104 generates a sleep information item indicating the time period for which a sleep state is to be continued, and a sleep request requesting the sleep state, based on the predicted latency information item, if the receiving sleep control unit 104 receives the buffer-full signal and the predicted latency information item from the receiving buffer unit 102 and the latency prediction unit 103, respectively. The sleep state indicates a state in which electricity is supplied only to elements which are at minimum necessary for activation, and is not supplied to the other elements. The receiving sleep control unit 104 also generates an activation signal for returning the state of the apparatus from the sleep state to an activated state.

Upon receiving the sleep request from the receiving sleep control unit 104, the power control unit 105 turns off the power supplies other than those for the minimum functions necessary when the sleep state is released in the wireless communication system. In contrast, upon receiving the activation signal from the receiving sleep control unit 104, the power control unit 105 turns on all power supplies.

The access control unit 106 generally receives a header information item from the wireless receiving unit 101 and generates an Ack frame parameter for transmitting an Ack frame that includes a sequence number (SN) indicating the data number contained in the header information item. The Ack frame parameter includes the header information item of the Ack frame, and a time point information item indicating the transmission time point of the Ack frame. The Ack frame is an acknowledgment frame for informing the data transmitting side (i.e., the wireless communication apparatus which transmits a data frame) that data item has been normally received. If data has been normally received, an Ack frame including the SN of the data item is transmitted. Thus, until current data item is normally received, transmission of an Ack frame including the SN of a preceding data item is continued.

Further, when the access control unit 106 receives the header information item and the sleep information item from the wireless receiving unit 101 and the receiving sleep control unit 104, respectively, it generates a sleep frame parameter based on the sleep information item. The sleep frame parameter that includes a frame header information item having sleep period, data size, and a time point information item indicating the transmission time point of the sleep information item.

The frame generation unit 107 receives the Ack frame parameter or the sleep frame parameter from the access control unit 106, and generates a data frame, an Ack frame corresponding to the Ack frame parameter, a sleep frame corresponding to the sleep frame parameter or another control frame, in response to a request from the high-level protocol or the host system.

The wireless transmitting unit 108 has functions necessary for modulating a data item which is to be transmitted based on the specifications of the wireless communication system including a header generator, error correction encoder, modulator, power amplifier, frequency converter, filter, antenna, etc. The wireless transmitting unit 108 receives a data frame, Ack frame, sleep frame, or another control frame from the frame generation unit 107, and also receives, when payload data item is included in the sleep frame, the payload data item from the high-level protocol, host system or access control unit 106, thereby modulating the Ack frame or the sleep frame to be transmitted.

Figure 2:
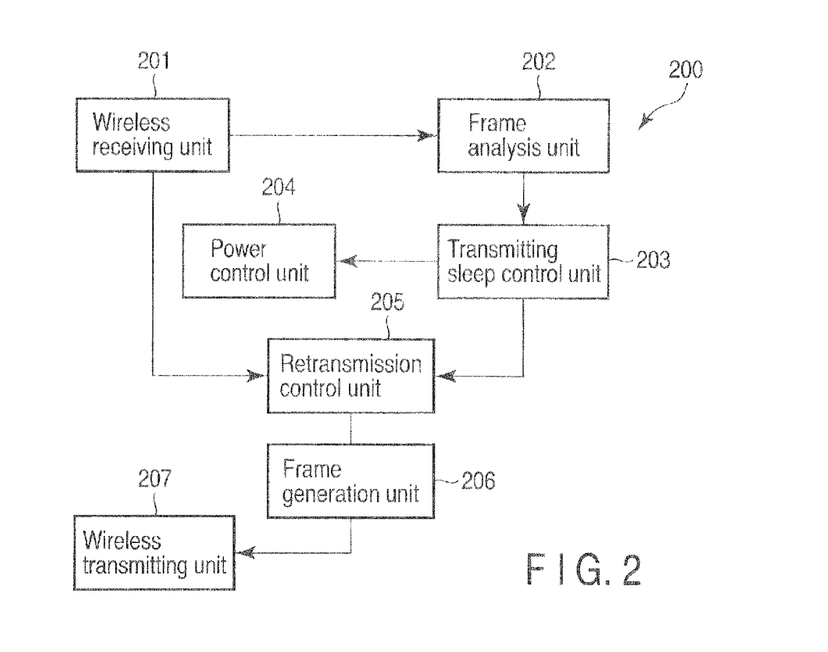
FIG. 2 is a block diagram illustrating a wireless transmitting apparatus according to the first embodiment.

Referring then to FIG. 2, a description will be given of a wireless transmitting apparatus 200. As shown, the wireless transmitting apparatus 200 includes a wireless receiving unit 201, a frame analysis unit 202, a transmission sleep control unit 203, a power control unit 204, a retransmission control unit 205, frame generation unit 206 and a wireless transmitting unit 207.

No description will be given of the wireless receiving unit 201, power control unit 204, frame generation unit 206 and wireless transmitting unit 207, since they operate in the same ways as the wireless receiving unit 101, power control unit 105, frame generation unit 107 and wireless transmitting unit 108 of the wireless communication apparatus 100, respectively.

The frame analysis unit 202 receives the header information item and the payload data item from the wireless receiving unit 201, and analyzes a control information item included in the header information item and the payload data item. If the sleep information item is included in the control information item, the frame analysis unit 202 extracts the sleep information item.

The transmission sleep control unit 203 receives the sleep information item from the frame analysis unit 202, and generates a sleep request and a retransmission stop signal for stopping data retransmission, based on the sleep information item. The transmission sleep control unit 203 also generates an activation signal, like the receiving sleep control unit 104.

The retransmission control unit 205 generates a frame parameter related to a data frame when there is a data to be transmitted. More specifically, the retransmission control unit 205 receives the header information item from the wireless receiving unit 201, and analyzes the header information item. If retransmission control unit 205 determines from this analysis that the received frame is an Ack frame, it compares the SN contained in the Ack frame with the SN contained in a data frame previously transmitted. If the retransmission control unit 205 determines that the former SN is equal to the latter, it determines that frame exchange has been established, thereby generating a frame parameter that causes a subsequent data frame to include a SN indicating the subsequent frame. In contrast, if the retransmission control unit 205 determines that an Ack frame is not yet received, or if it determines that the SN of the received Ack frame is not equal to the SN contained in the transmitted data frame, it generates a frame parameter for retransmitting the same data frame as the transmitted one.

Referring to the sequence view of FIG. 3, a description will be given of the operations of the wireless transmitting apparatus and receiving apparatus according to the first embodiment.

Figure 3:
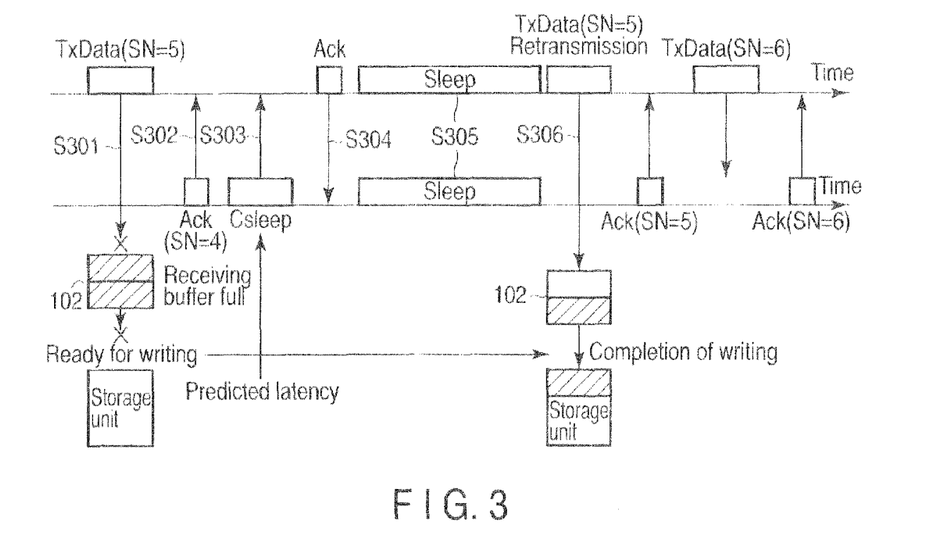
FIG. 3 is a sequence view illustrating operation examples of the wireless receiving apparatus and transmitting apparatus according to the first embodiment.

In FIG. 3, the upper portion indicates the operation of the wireless transmitting apparatus 200, and the lower portion indicates the operation of the wireless receiving apparatus 100. Assume here that neither of the wireless transmitting apparatus 200 and the wireless receiving apparatus 100 has fixed access priority, or that only the wireless receiving apparatus 100 has fixed access priority. The receiving buffer unit 102 of the wireless receiving apparatus 100 transfers data item to another storage device.

At step S301, the wireless receiving apparatus 100 is in a buffer-full state. Therefore, even if it receives data of "SN=5" from the wireless transmitting apparatus 200, the receiving buffer unit 102 cannot store the data item.

Accordingly, at step S302, the wireless receiving apparatus 100 returns an Ack frame of "SN=4" to the wireless transmitting apparatus 200.

At step S303, the wireless receiving apparatus 100 transmits, to the wireless transmitting apparatus 200, a sleep frame (hereinafter also referred to as a C-Sleep frame) including the sleep information item obtained based on the predicted latency information item that indicates a latency predicted to occur until the buffer-full state of the receiving buffer unit 102 is released, if the latency prediction unit 103 generates the predicted latency information item.

At step S304, the wireless transmitting apparatus 200 returns an Ack frame to the wireless receiving apparatus 100, when it receives the C-Sleep frame.

At step S305, the wireless receiving apparatus 100 transits a sleep state for the time period indicated by the sleep information item, when it receives the Ack frame from the wireless transmitting apparatus 200. More specifically, the receiving sleep control unit 104 sends a sleep report to the power control unit 105, and then the power control unit 105 turns off the power supplies other than those for the minimum functions necessary when the sleep state is released. After the time period indicated by the sleep information item elapses, the receiving sleep control unit 104 supplies the power control unit 105 with an activation signal for turning on the above-mentioned power supplies, thereby activating the apparatus from the sleep state. Similarly, the wireless transmitting apparatus 200 transits a sleep state for the time period indicated by the sleep information item, after supplying the wireless receiving apparatus 100 with an Ack frame in reply to a C-Sleep frame including the sleep information item. After the time period indicated by the sleep information item elapses, the wireless transmitting apparatus 200 is activated from the sleep state.

Although it is desirable that the wireless transmitting apparatus 200 and the wireless receiving apparatus 100 coincide with each other in sleep state period, this is not a requisite condition.

At step S306, the wireless receiving application 100 can receive a data frame from the wireless transmitting application 200, since it has a free area in the receiving buffer unit 102 when it is activated from the sleep state.

In the above-described first embodiment, since the wireless transmitting and receiving apparatuses transit a sleep state for the time period indicated by the predicted latency information item, useless retransmission. can be avoided in a buffer-full state, thereby reducing consumption of power.

(Second Embodiment)

The first embodiment supposes the case where both the receiving and transmitting sides do not have their respective fixed access priority, or where the receiving side has a fixed access priority. In contrast, the second embodiment supposes the case where the transmitting side has a fixed access priority.

Figure 4:
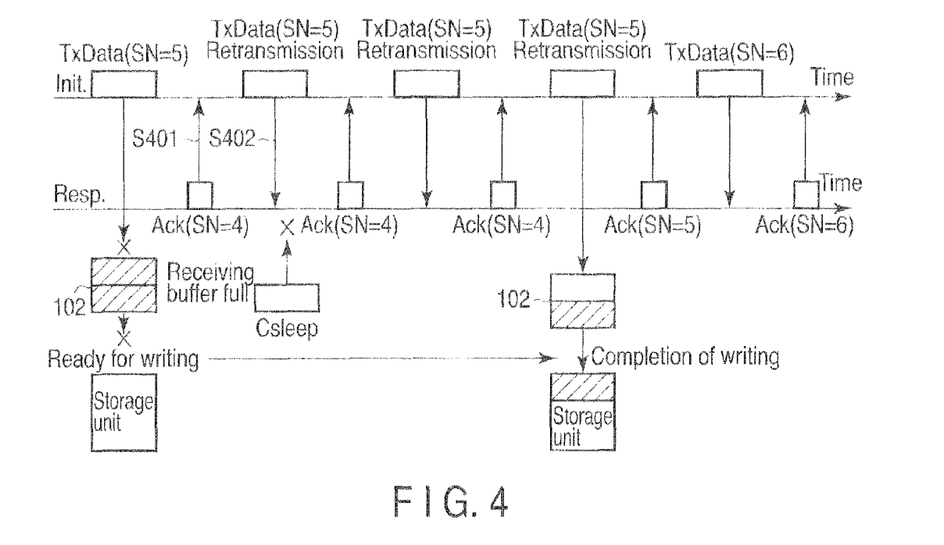
FIG. 4 is a sequence view illustrating operation examples of the wireless receiving apparatus and transmitting apparatus performed if one of the apparatuses has a fixed access priority.

Referring now to FIG. 4, a description will be given of a sequence of operations of the wireless transmitting and receiving apparatuses performed if the transmitting apparatus has a fixed access priority.

The wireless transmitting apparatus 200 in the upper portion of FIG. 4 is an "Initiator" having a fixed access priority, and the wireless receiving application 100 in the lower portion of FIG. 4 is a "Responder."

The initiator has a shorter Inter Frame Space (IFS), which is a term in which transmission can be started after receiving or transmitting a frame, than the responder.

At step S401, the wireless receiving apparatus 100 attempts to transmit a C-Sleep frame after returning an Ack frame of "SN=4" to the wireless transmitting apparatus 200 as in the first embodiment. However, since the IFS of the transmitting apparatus 200 serving as the initiator is short, the wireless transmitting apparatus 200 starts retransmission of a data frame earlier than the transmission of the C-Sleep frame from the wireless receiving apparatus 100, as is evident from step S402. As a result, the wireless receiving apparatus 100 may not transmit the C-Sleep frame, and therefore both the receiving and transmitting apparatuses may not transit to a sleep state.

In light of this, in the second embodiment, an Ack frame, which includes the sleep information item obtained from the predicted latency information item, is transmitted so that the wireless communication apparatuses can transit to the sleep state regardless of the priority order of the apparatuses, thereby reducing the consumption of power.

The wireless communication apparatuses of the second embodiment perform substantially the same operations as those of the first embodiment, and differ only in that the access control unit transmits, instead of a C-Sleep frame, an Ack frame including the sleep information item.

Figure 5:
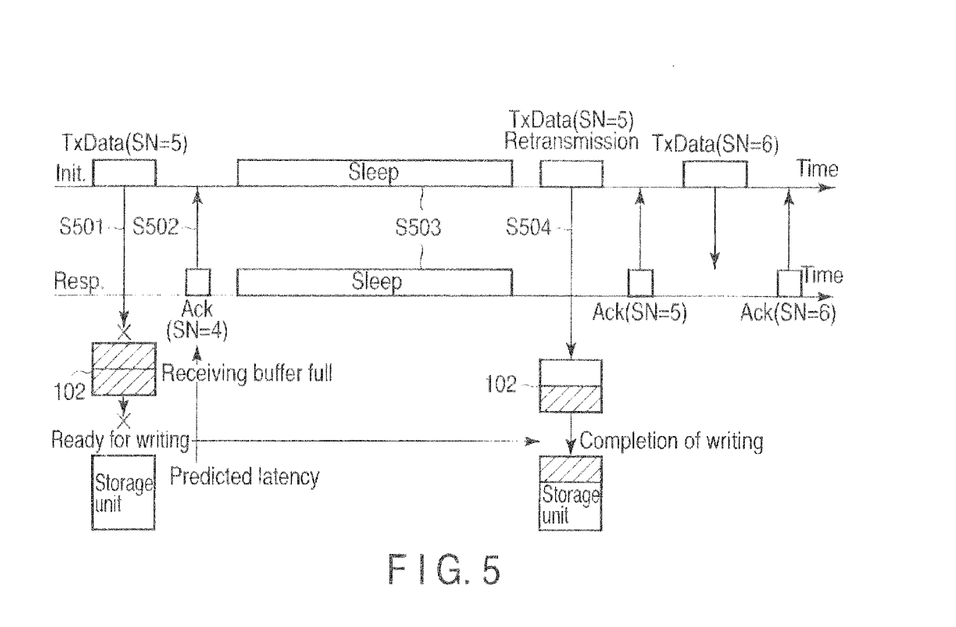
FIG. 5 is a sequence view illustrating operation examples of wireless receiving apparatus and transmitting apparatus according to a second embodiment.

Referring to FIG. 5, a description will be given of a sequence of operations of the wireless transmitting and receiving apparatuses according to the second embodiment.

Since the Ack frame is generally formed of only the header information item having no data portion, the header information item is made to include the sleep information item as an information item other than the SN information item. Although the number of bits for indicating the time period of sleep is not limited, a smaller number of bits are desirable in view of overhead. For instance, if the time period of sleep is preset, the sleep information item may be formed of one bit that indicates whether a sleep state is to be transited.

At step S501, the wireless receiving apparatus 100 is in the buffer-full state, and cannot store, in the receiving buffer unit 102, data of "SN=3," if any, received from the wireless transmitting unit 200.

At step S502, the wireless receiving apparatus 100 transmits, to the wireless transmitting apparatus 200, an Ack frame including the sleep information item generated based on the predicted latency information item.

At step S503, the wireless transmitting apparatus 200 analyzes the sleep information item included in the Ack frame, by the frame analysis unit 202, and interrupts the retransmission process to thereby transit to the sleep state in accordance with the sleep information item. The wireless receiving apparatus 100 transits to the sleep state if no data item is retransmitted from the wireless transmitting apparatus 200 for a preset time period. In the second embodiment, the way of the transit to the sleep state and that of the activation therefrom are similar to those in the first embodiment.

At step S504, since a free area is secured in the receiving buffer unit 102 of the wireless receiving apparatus 100 when both the wireless transmitting and receiving apparatuses 200 and 100 are activated from the sleep state, the wireless receiving apparatus 100 can store a data frame in the receiving buffer unit 102.

In the second embodiment in which the sleep information item is included in the Ack frame, both wireless communication apparatuses can transit to the sleep state regardless of the fixed access priority, whereby useless retransmission can be omitted to reduce consumption of power.

(Third Embodiment)

In the above-described second embodiment, to include the sleep information item in the header information item of the Ack frame, the case where the bit length of the header information item is extended is supposed. The Ack frame is necessarily transmitted after data is received. If the length of the Ack frame, which does not include the payload data item, is increased, a period of time for transmitting the data frame is shortened. This may reduce the entire throughput and cause the overhead by the Ack frame.

In a third embodiment, after receiving a data frame from a wireless transmitting apparatus, a wireless receiving apparatus transmits, to the wireless transmitting apparatus, a C-Sleep frame carrying payload data item that includes the sleep information item, instead of an Ack frame. This enables information item indicating a sleep time period to be transmitted from the wireless receiving apparatus with no fixed access priority, thereby avoiding the overhead by the Ack frame.

Figure 6:
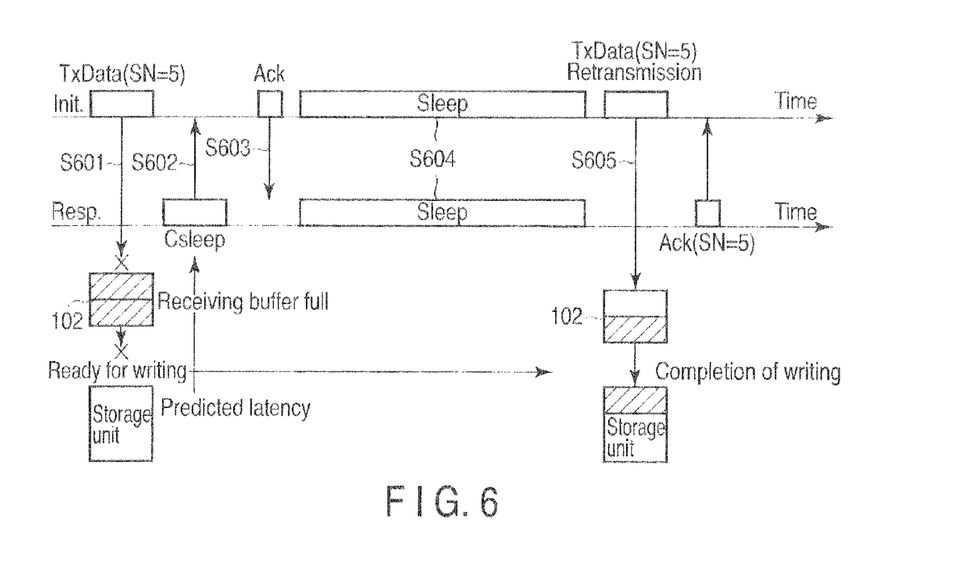
FIG. 6 is a sequence view illustrating operation examples of wireless receiving apparatus and transmitting apparatus according to a third embodiment.

A sequence of operations of the wireless transmitting and receiving apparatuses according to the third embodiment will be described with reference to FIG. 6.

At step S601, the wireless receiving apparatus 100 is in the buffer-full state, and cannot store, in the receiving buffer unit 102, data of "SN=5," if any, received from the wireless transmitting unit 200.

At step S602, the wireless receiving apparatus 100 transmits, to the wireless transmitting apparatus 200, a C-Sleep frame that carries payload data including the sleep information item generated based on the predicted latency information item, if the latency prediction unit 102 acquires the predicted latency information item after a data frame is received from the wireless transmitting apparatus 200.

At step S603, the wireless transmitting apparatus 200 receives the C-Sleep data including the sleep information item, analyzes the sleep information item, and transmits an Ack frame to the wireless receiving apparatus 100.

At step S604, the wireless transmitting apparatus 200 keeps in a sleep state for the time period indicated by the sleep information item, after transmitting the Ack frame. After receiving the Ack frame, the wireless receiving apparatus 100 keeps in a sleep state for the time period indicated by the sleep information item. In the third embodiment, the way of the transit to the sleep state and that of the activation therefrom are similar to those in the first embodiment.

At step S605, the wireless receiving apparatus 100 can receive a data frame from the wireless transmitting application. 200, since it has a free area in the receiving buffer unit 102 when it is activated from the sleep state.

In the above-described third embodiment, since the C-Sleep frame is transmitted instead of the Ack frame, the wireless receiving apparatus having no fixed access priority can transmit the sleep time information item with involving overhead, with the result that both wireless communication apparatuses can transit a sleep state, and hence useless retransmission can be avoided, thereby reducing consumption of power.

(Fourth Embodiment)

A fourth embodiment differs from the other embodiments in that a wireless transmitting apparatus transmits a C-Sleep frame to the receiving apparatus to transit both wireless communication apparatuses to a sleep state. This structure enables both wireless transmitting apparatus and receiving apparatus to shift to the sleep state even if the predicted latency information item cannot be obtained.

Figure 7:
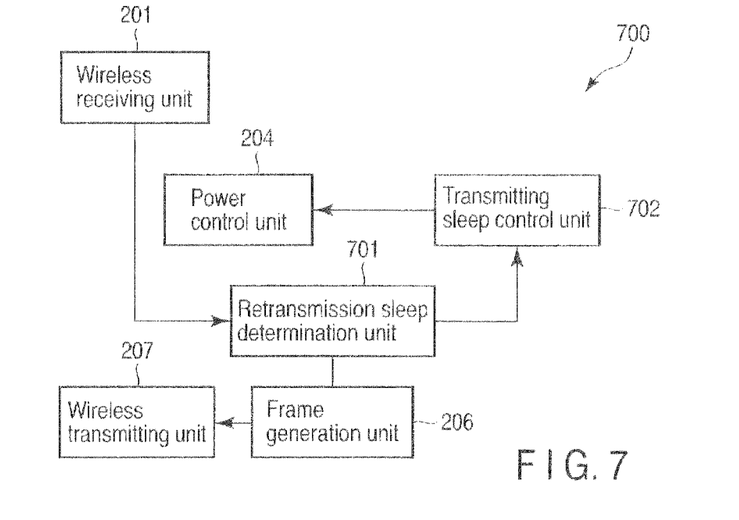
FIG. 7 is a block diagram illustrating a wireless transmitting apparatus according to a fourth embodiment.

Referring to the block diagram of FIG. 7, a wireless transmitting apparatus 700 according to the fourth embodiment will be described.

The wireless transmitting apparatus 700 of the fourth embodiment includes a wireless receiving unit 201 (also referred to as a receiving unit), a power control unit 204, a wireless transmitting unit 207 (also referred to as a transmitting unit), a frame generation unit 206, a retransmission sleep determination unit 701 (also referred to as a sleep determination unit), and a transmitting sleep control unit 702 (also referred to as a sleep control unit).

No description will be given of the wireless receiving unit 201, power control unit 204, frame generation unit 206 and wireless transmitting unit 207, since they operate in the same ways as the corresponding elements of the first embodiment.

The retransmission sleep determining unit 701 receives the header information item from the wireless receiving unit 201. The retransmission sleep determining unit 701 analyzes the SN of the header information item, and generates a data frame parameter for retransmitting transmission data item, if this SN differs from the SN contained in the header information item of the transmission data transmitted immediately before receiving the first-mentioned header information item, and if the first-mentioned SN indicates the data that was acknowledged before the acknowledgement of the transmission data item. Further, the retransmission sleep determining unit 701 generates the sleep information item when receiving the same SN data N times (N is an arbitrary natural number). The time period of sleep and the value of N are set beforehand arbitrarily.

The transmitting sleep control unit 702 generates a sleep reporting signal upon receiving the sleep information item from the retransmission sleep determining unit 701.

Figure 8:
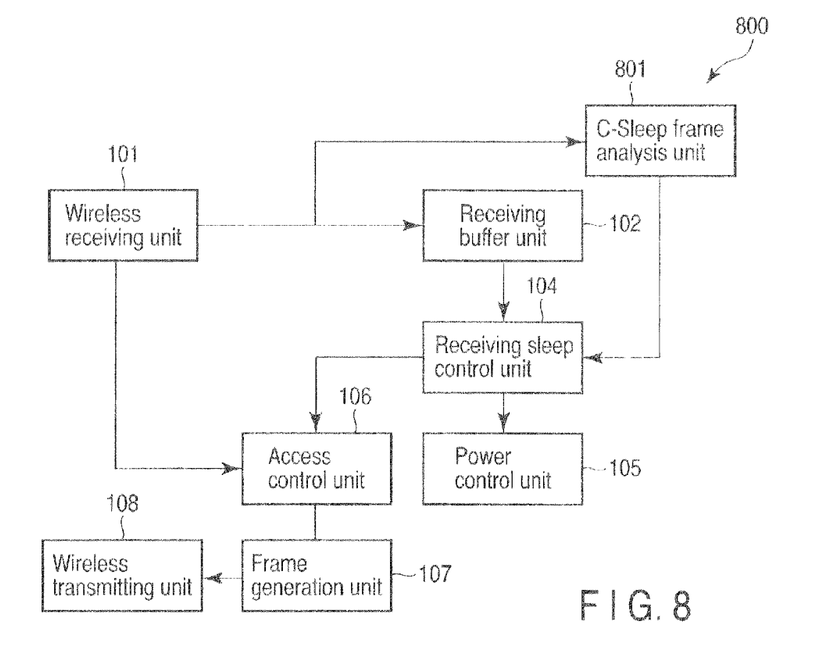
FIG. 8 is a block diagram illustrating a wireless receiving apparatus according to the fourth embodiment.

Referring to the block diagram of FIG. 8, a wireless receiving apparatus 800 according to the fourth embodiment will be described.

The wireless receiving apparatus 800 of the fourth embodiment includes a wireless receiving unit 101, a receiving buffer unit 102, a receiving sleep control unit 104, a power control unit 105, an access control unit 106, a frame generation unit 107, a wireless transmitting unit 108, and a C-Sleep frame analysis unit 801.

No description will be given of the wireless receiving unit 101, receiving buffer unit 102, receiving sleep control unit 104, power control unit 105, access control unit 106, frame generation unit 107 and wireless transmitting unit 108, since they operate in the same ways as the corresponding elements of the first embodiment.

The C-Sleep frame analysis unit 801 receives payload data from the wireless receiving unit 101, and extracts therefrom the sleep time information item if the payload data item is a C-Sleep frame data item.

Figure 9:
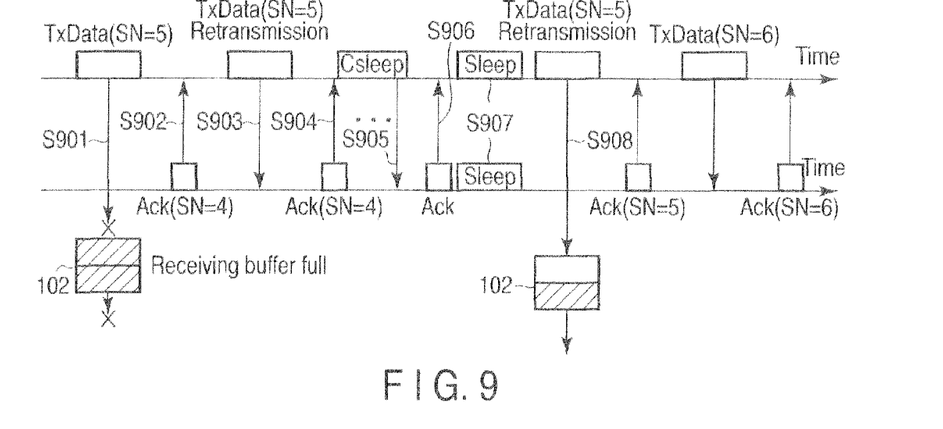
FIG. 9 is a sequence view illustrating operation examples of the wireless receiving apparatus and transmitting apparatus according to the fourth embodiment.

A sequence of operations of the wireless transmitting and receiving apparatuses according to the fourth embodiment will be described with reference to FIG. 9.

At step S901, the wireless receiving apparatus 100 is in the buffer-full state, and cannot store, in the receiving buffer unit 102, a data frame of "SN=5" received.

At step S902, since the wireless receiving apparatus 100 cannot store the received data frame of "SN=5" in the receiving buffer unit 102, and hence the SN is not updated, it transmits an Ack frame of "SN=4" to the wireless transmitting apparatus 200.

At step S903, upon receiving the Ack frame of "SN=4," the wireless transmitting apparatus 200 retransmits the data frame of "SN=5", since the SN of the Ack frame transmitted from the wireless receiving apparatus 100 differs from the SN of the data frame that the wireless transmitting apparatus 200 transmitted immediately before, that is, the wireless transmitting apparatus 200 has not received the Ack frame of "SN=5."

At step S904, since the receiving buffer unit 102 of the wireless receiving apparatus 100 does not yet have a free area, the wireless receiving apparatus 100 transmits, to the wireless transmitting apparatus 200, an Ack frame including the same SN as the Ack frame that the wireless receiving apparatus 100 transmitted immediately before the current transmission.

At step S905, the wireless transmitting apparatus 200 counts the number of times of receiving of Ack frames with the same SN from the wireless receiving apparatus 100, and transmits a C-Sleep frame to the wireless receiving apparatus 100 if the counted number reaches a preset value N.

At step S906, upon receiving the C-Sleep frame from the wireless transmitting apparatus 200, the wireless receiving apparatus 100 transmits an Ack frame thereto.

At step S907, the wireless receiving apparatus 100 transits to its sleep state based on the sleep information item included in the C-Sleep frame. On the other hand, the wireless transmitting apparatus 200 transits to its sleep state upon receiving the Ack frame sent in reply to the C-Sleep frame. In the fourth embodiment, the way of the transit to the sleep stage and that of the activation therefrom are similar to those in the first embodiment.

At step S908, the wireless receiving apparatus 100 is activated from the sleep state, and therefore the receiving buffer unit 102 secures a free area. Namely, the wireless receiving apparatus 100 can receive a data frame from the wireless transmitting apparatus 200.

In the above-described fourth embodiment, even when the predicted latency information item cannot be obtained, wireless transmitting and receiving apparatuses can transit to their sleep states by the transmission of the C-Sleep frame from the wireless transmitting apparatus, which eliminates useless retransmission and therefore realizes power saving.

(Comparative Example)

Figure 10:
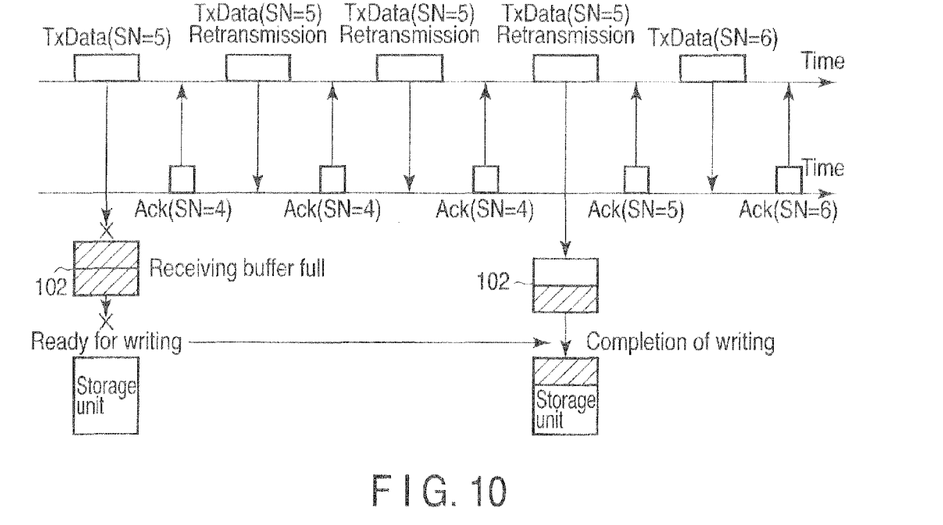
FIG. 10 is a view illustrating an example of general data retransmission.

Referring then to FIG. 10, a description will be given of general retransmission as a comparative example of the first to fourth embodiments.

In FIG. 10, the upper portion indicates the data transmitting side, and the lower portion indicates the data receiving side. Firstly, assume that the data transmitting side has transmitted a data frame of "SN=5," and that the data receiving side has successfully received but is in the buffer-full state. At this time, the data receiving side returns, to the data transmitting side, an Ack frame of "SN=4," which could be stored immediately before receiving the data frame of "SN=5." If the data receiving side is not in the buffer-full state, it transmits an Ack frame of "SN=5."

Upon receiving the Ack frame of "SN=4," the data transmitting side understands that the data receiving side could not receive the data frame of "SN=5" for some reason, and therefore retransmits the data frame of "SN=5."

The retransmission process is continued until the data receiving side is released from the buffer-full state, or the data transmitting side reaches a data retransmission limit. The data transmission can be thus completed although a retransmission delay occurs in data transmission. However, since useless data transmission and receiving are performed between the data transmitting and receiving sides during retransmission, consumption of power will inevitably increase.

The above-described first to fourth embodiments can reduce the power consumed during retransmission.

(Fifth Embodiment)

In a fifth embodiment, an antenna is included in the wireless receiving apparatus 100, the wireless transmitting apparatus 200, the wireless transmitting apparatus 700, and/or the wireless receiving apparatus 800, so that it is connected between the wireless receiving unit 101 and the wireless transmitting unit 108, or between the wireless receiving unit 201 and the wireless transmitting unit 207. By virtue of this structure, each of the wireless receiving apparatus and transmitting apparatuses can be formed as an apparatus incorporating a single antenna, and therefore the required footprint can be minimized. Further, since the single antenna is shared between transmission processing and receiving processing, each of the wireless receiving and transmitting apparatuses can be made compact.

(Sixth Embodiment)

In a sixth embodiment, a buffer is connected to the frame generation unit (107, 206), the frame analysis unit 202, and the wireless receiving unit 201, as well as to the receiving buffer unit 102. By thus incorporating the buffer in wireless receiving and transmitting apparatuses, both transmission data and received data can be held in the buffer, which facilitates retransmission processing and external output processing.

(Seventh Embodiment)

In a seventh embodiment, a bus is connected to the buffer employed in the sixth embodiment, and is also connected to an external interface unit and a processor unit. In the processor unit, firmware operates. By thus incorporating the firmware in each of the wireless receiving and transmitting apparatuses, the functionality of each of the wireless receiving and transmitting apparatuses can be easily changed.

(Eighth Embodiment)

In an eighth embodiment, a clock generation unit is included in the wireless receiving apparatus 100, the wireless transmitting apparatus 200, the wireless transmitting apparatus 700, and/or the wireless receiving apparatus 800. The clock generation unit is connected to an external apparatus (a host). The clock signal output from the clock generation unit via an output terminal thereof enables the host to operate in synchronism with each of the wireless receiving and transmitting apparatuses.

(Ninth Embodiment)

In a ninth embodiment, a power source unit and a wireless power feeding unit are included in the wireless receiving apparatus 100, the wireless transmitting apparatus 200, the wireless transmitting apparatus 700, and/or the wireless receiving apparatus 800. The power source unit and the wireless power feeding unit are connected to the power control unit (105, 204). By thus incorporating the power source in each of the wireless receiving and transmitting apparatuses, low power consumption operation based on the controlled power supply can be realized.

(Tenth Embodiment)

A tenth embodiment is obtained by adding a Near Field Communications (NFC) transceiver unit to the ninth embodiment, and connecting this unit to the power control unit. By thus incorporating the NFC transceiver unit in each of the wireless receiving and transmitting apparatuses, authentication processing can be easily performed. Further, by performing power control using the NFC transceiver unit as a trigger, low consumption of power can be realized in a standby state.

(Eleventh Embodiment)

An eleventh embodiment is obtained by adding an SIM card to the seventh embodiment and connecting the SIM card to the bus. By thus incorporating the NFC transceiver unit in each of the wireless receiving and transmitting apparatuses, authentication processing can be easily performed.

(Twelfth Embodiment)

An eleventh embodiment is obtained by adding a moving picture compander unit to the seventh embodiment and connecting this unit to the bus. By thus incorporating the moving picture compander unit in each of the wireless receiving and transmitting apparatuses, transmission of a compressed moving picture and expansion of a received compressed moving picture can be easily performed.

(Thirteenth Embodiment)

A thirteenth embodiment is obtained by adding an LED unit to the seventh embodiment and connecting the LED unit to the bus. By thus incorporating the LED unit in each of the wireless receiving and transmitting apparatuses, users can easily detect the operation state of each of the wireless receiving and transmitting apparatuses.

(Fourteenth Embodiment)

A fourteenth embodiment is obtained by adding a vibrator to the seventh embodiment and connecting the vibrator to the bus. By thus incorporating the vibrator in each of the wireless receiving and transmitting apparatuses, users can easily detect the operation state of each of the wireless receiving and transmitting apparatuses.

(Fifteenth Embodiment)

A fifteenth embodiment is obtained by adding a wireless LAN to the seventh embodiment and connecting the wireless LAN to the bus. By thus incorporating the wireless LAN in each of the wireless receiving and transmitting apparatuses, communication by the wireless LAN, and communication by the wireless receiving apparatus 100, the wireless transmitting apparatus 200, the wireless transmitting apparatus 700 or the wireless receiving apparatus 800, can be switched depending on the situation.

(Sixteenth Embodiment)

A sixteenth embodiment is obtained by adding a switch to the fourteen embodiment such that the switch is interposed between the antenna and the wireless receiving unit 101 and the wireless transmitting unit 108, or between the wireless receiving unit 201 and the wireless transmitting unit 207, and connecting the switch to the wireless LAN as a switching destination. By thus incorporating the switch in each of the wireless receiving and transmitting apparatuses, communication by the wireless LAN, and communication by the wireless receiving apparatus 100, the wireless transmitting apparatus 200, the wireless transmitting apparatus 700 or the wireless receiving apparatus 800, can be switched depending on the situation, with the antenna shared.

While certain embodiments have been described, these embodiments have been presented by way of example only, and are riot intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A wireless receiving apparatus comprising:
a receiving unit configured to receive a data item, and to extract a payload data item from the received data item;
a buffer configured to generate a buffer-full signal if a size of the payload data item is larger than a free area size of the buffer, and to store the extracted payload data item if the size of the payload data item is not larger than the free area size;
a prediction unit configured to generate a predicted latency information item indicating a first period of time to secure a free area required for storing the payload data item;
a sleep control unit configured to generate a sleep information item based on the predicted latency information item if the buffer-full signal is generated, the sleep information item indicating a second period of time for which a power supply is kept in a sleep state, the sleep state indicating a state in which electricity is supplied only to elements which are at minimum necessary for activation;
an access control unit configured to generate a sleep frame parameter comprising the sleep information item;
a generation unit configured to generate a sleep frame based on the sleep frame parameter; and
a transmitting unit configured to transmit the sleep frame;
wherein after receiving an acknowledgment of receiving of the sleep frame, the sleep control unit keeps the power supply in the sleep state for the second period of time; and
wherein the sleep frame parameter further comprises a time point information item indicating a point of time at which the sleep information item is transmitted, and the access control unit sets the point of time indicated by the time point information item included in the sleep frame parameter, as a point of time at which an acknowledgment of receiving of the data item is transmitted.

2. The apparatus according to claim 1, further comprising an antenna connected to the receiving unit and the transmitting unit.

3. A wireless transmitting apparatus, comprising:
a receiving unit configured to receive an acknowledgment and extract, from the acknowledgment, a first header information item comprising a first data number;
a determination unit configured to analyze the first header information item, and to retransmit a transmission data item transmitted immediately before receiving the acknowledgment, if the first data number is not equal to a second data number included in a second header information item of the transmission data item and if the first data number indicates data acknowledged before the transmission data item, and to count number of times of receiving the data corresponding to the first data number, and to generate, if the counted number reaches a preset value, a sleep frame parameter including a sleep information item and a time point information item indicating a point of time at which the sleep information item is transmitted, the sleep information item indicating a period of time for which a power supply is kept in a sleep state, the sleep state indicating a state in which electricity is supplied only to elements which are at minimum necessary for activation;

a generation unit configured to generate a sleep frame based on the sleep frame parameter;

a transmitting unit configured to transmit the sleep frame; and a sleep control unit configured to keep the power supply in the sleep state for the period of time indicated by the sleep information item, after receiving an acknowledgment of receiving the sleep frame.

4. The apparatus according to claim 3, further comprising an antenna connected to the receiving unit and the transmitting unit.

5. A wireless receiving method, comprising:

receiving a data item, and extracting a payload data item from the received data item:

generating a buffer-full signal if a size of the payload data item is larger than a free area size of a buffer, and storing the extracted payload data item if the size of the payload data item is not larger than the free area size;

generating a predicted latency information item indicating a first period of time to secure a free area required for storing the payload data item;

generating a sleep information item based on the predicted latency information item if the buffer-full signal is generated, the sleep information item indicating a second period of time for which a power supply is kept in a sleep state, the sleep state indicating a state in which electricity is supplied only to elements which are at minimum necessary for activation;

generating a sleep frame parameter comprising the sleep information item;

generating a sleep frame based on the sleep frame parameter; and transmitting the sleep frame;

wherein after receiving an acknowledgment of receiving of the sleep frame, the power supply is kept in the sleep state for the second period of time; and wherein the sleep frame parameter further comprises a time point information item indicating a point of time at which the sleep information item is transmitted, and the point of time indicated by the time point information item included in the sleep frame parameter is set as a point of time at which an acknowledgment of receiving of the data item is transmitted.

6. A wireless transmitting method, comprising:

receiving an acknowledgment, and extracting from the acknowledgment a first header information item comprising a first data number;

analyzing the first header information item, and retransmitting a transmission data item transmitted immediately before receiving the acknowledgment, if the first data number is not equal to a second data number included in a second header information item of the transmission data item and if the first data number indicates data acknowledged before the transmission data item, and counting number of times of receiving the data corresponding to the first data number, and generating, if the counted number reaches a preset value, a sleep frame parameter including a sleep information item and a time point information item indicating a point of time at which the sleep information item is transmitted, the sleep information item indicating a period of time for which a power supply is kept in a sleep state, the sleep state indicating a state in which electricity is supplied only to elements which are at minimum necessary for activation;

generating a sleep frame based on the sleep frame parameter;

transmitting the sleep frame; and keeping the power supply in the sleep state for the period of time indicated by the sleep information item, after receiving an acknowledgment of receiving the sleep frame.

* * * * *